United States Patent
Gao et al.

(10) Patent No.: US 8,947,099 B2
(45) Date of Patent: Feb. 3, 2015

(54) EQUIVALENT POWER METHOD OF REDUCING THE AFFECTS OF VOLTAGE VARIATION DURING ACTIVE MATERIAL ACTUATION

(75) Inventors: Xiujie Gao, Troy, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 391 days.

(21) Appl. No.: 13/290,111

(22) Filed: Nov. 6, 2011

(65) Prior Publication Data

US 2013/0116950 A1    May 9, 2013

(51) Int. Cl.
*G01N 27/00* (2006.01)

(52) U.S. Cl.
USPC .......................... 324/522; 324/71.1; 324/713

(58) Field of Classification Search
USPC ................................ 324/522, 691, 713, 71.1
See application file for complete search history.

(56) References Cited

U.S. PATENT DOCUMENTS

2009/0174390 A1\* 7/2009 Virtanen ...................... 324/71.1

\* cited by examiner

*Primary Examiner* — Vincent Q Nguyen

(57) ABSTRACT

An equivalent power method for reducing the effects of voltage variation during at least one active material actuation event, includes determining an applied real output based on the ideal voltage of a voltage source, the corresponding ideal output of a controller, and a measured real voltage, and for providing voltage out of bounds compensation, by further determining a difference based on the maximum available power output of the controller during said at least one event, and applying the difference to determine the applied real output during subsequent event(s).

17 Claims, 1 Drawing Sheet

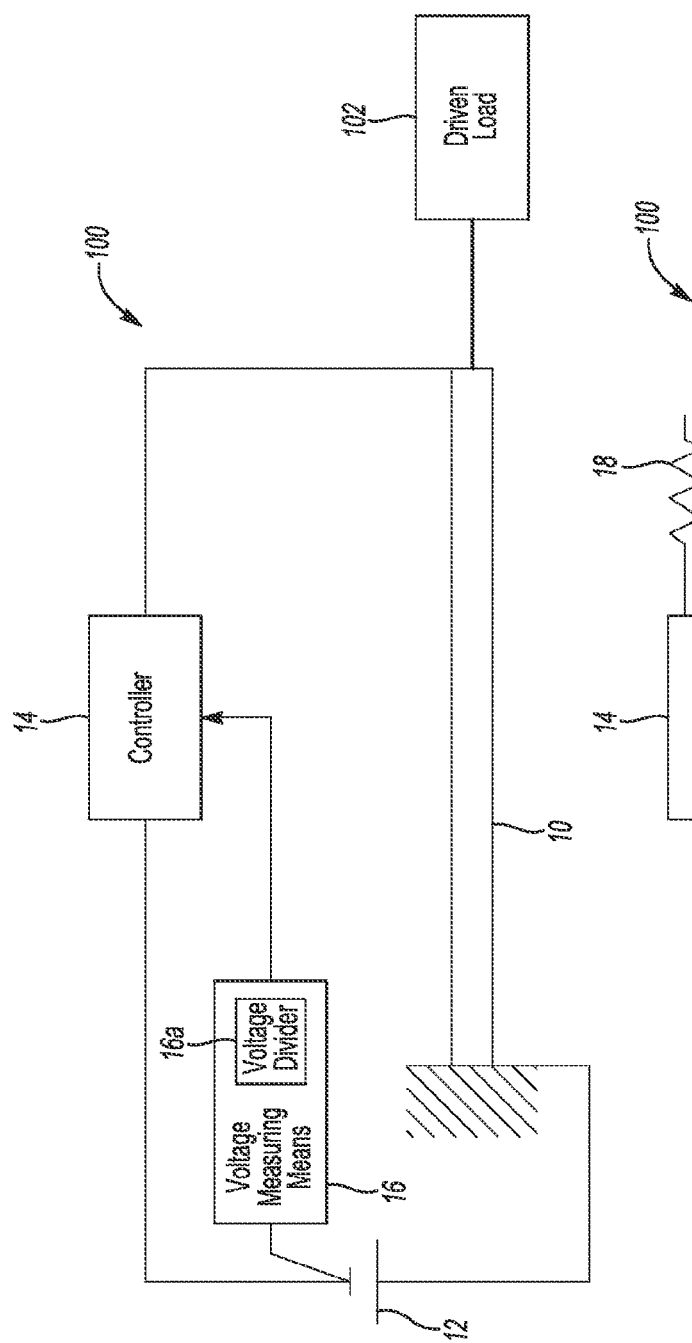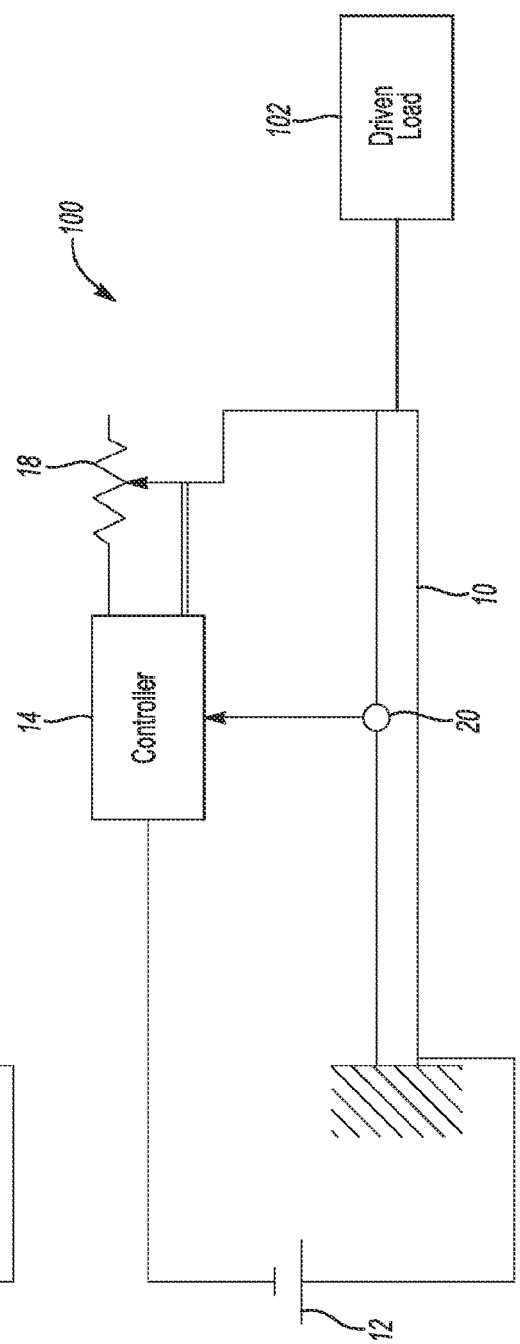

EQUIVALENT POWER METHOD OF REDUCING THE AFFECTS OF VOLTAGE VARIATION DURING ACTIVE MATERIAL ACTUATION

BACKGROUND OF THE INVENTION

1. Field of the Invention

The present disclosure generally relates to active material actuation and methods of compensating for voltage variation during the same. More particularly, the disclosure presents an equivalent power method of reducing the ill-effects of rapid voltage variation during active material actuation.

2. Discussion of Prior Art

Active material actuators offer many advantages over their electro-mechanical counterparts, including less noise (both with respect to acoustic and EMF), weight, energy consumption, and complexity, but typically require that a set of preconditions be met in order to ensure consistent performance. One precondition is the need to stabilize voltage or reduce the effects of rapid voltage variation. In an automotive setting, for example, it is appreciated that charging systems and batteries often produce varying voltages from cycle to cycle due to temperature variation, the changing age/life cycle of the voltage source, or other characteristics inherent to the circuit; moreover, voltage variations are also experienced intra-cycle due to occurrences such as engine start-up, verification requirements, etc. Where the controller is programmed to produce the same output irrespective of the real voltage, it is further appreciated that the timing and/or stroke of the actuator may be caused to consequentially vary; and as a result, a driven member or otherwise resultant action to be imprecisely translated or insufficiently produced.

Conventional mechanisms and circuit implements, such as voltage regulators, have been developed to maintain a generally constant voltage; however, these mechanisms/implements are not always practical, require additional parts, and may, therefore, result in substantial increases in complexity and costs. Among these, proportional-integral-derivative (PID) controllers have traditionally been used to account for such variations through the P and D parameters (constant or extracted from a look-up table of voltage and/or temperature), and the I parameter accumulated over time; however, these measures also present concerns. For example, look-up tables introduce discontinuity and reduce system robustness, while time delays due to integration may produce undesired performance.

BRIEF SUMMARY OF THE INVENTION

The present invention addresses these concerns, and recites an equivalent power method for reducing the effects of voltage variation during active material actuation. The invention is adapted for use by an active material actuator having communicatively coupled thereto a controller, and presents an algorithm executable by the pre-existing controller. That is to say, the invention provides a readily implemented means for retrofitting or reprogramming an existing device to reduce the ill-effects of voltage variation without the implementation of additional hardware. By doing so, the invention is ultimately useful for increasing precision, consistency, and otherwise improving the performance of the actuated device. The invention enables the proper function of the actuator over a wider range of operating conditions, such as ambient temperature; and finally, the invention is useful for providing voltage out of bound compensation where the output is capped by the controller's capacity.

In general, the inventive method includes the steps of determining an ideal voltage within the circuit, calculating an ideal output based on the ideal voltage, such that the output is operable to ideally activate the actuator, and determining an ideal power based on the ideal output and ideal voltage. Next, a real voltage is measured during at least one actuation event, and an applied real output is determined based on the ideal voltage, ideal output, and real voltage, such that the applied real output and real voltage determine a real power equivalent to the ideal power. The real output is subject to the capacity of the controller. In this regard, and in a more preferred aspect of the invention, the method offers a closed loop system that compensates during subsequent events.

The disclosure may be understood more readily by reference to the following detailed description of the various features of the disclosure and the examples included therein.

BRIEF DESCRIPTION OF THE SEVERAL VIEWS OF THE DRAWING

A preferred embodiment(s) of the invention is described in detail below with reference to the attached drawing figures, wherein:

FIG. 1 is a schematic diagram of a circuit comprising an active material actuator, controller, microcontroller, and voltage source, wherein the actuator is drivenly coupled to a load, in accordance with a preferred embodiment of the invention; and FIG. 2 is a schematic diagram of a circuit comprising an active material actuator, controller, actuator sensor, voltage source, and variable resistance element connected in series to the actuator, in accordance with a preferred embodiment of the invention.

DETAILED DESCRIPTION OF THE INVENTION

The present invention concerns a machine executable method or algorithm for reducing the effects of voltage variation during active material actuation. More particularly, and as shown in the illustrated embodiments, the method is suited for implementation by or in association with electrically activated active materials, such as shape memory alloy (SMA) actuators 10, and as such require the backdrop of an electronic circuit 100 (FIGS. 1 and 2). The circuit 100 may compose any controlled machine, devise, or apparatus that advantageously employs active material actuation; for example, in an automotive setting, it is appreciated that the circuit 100 may compose an active ventilation system, so as to increase precision during louver positioning. The advantages of the present invention may be applied to any active material actuator 10 that derives its activation signal from a voltage source, either directly (via a voltage drop across the actuator or the current produced thereby) or indirectly (for example, via heat energy from an electrically energized heating element, or via electromagnetism). The following description of the preferred embodiments is merely exemplary in nature and is in no way intended to limit the invention, its application, or uses.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal and like fields.

Suitable active materials for use with the present invention include those that rely upon a voltage source to effect the signal, such as the afore-mentioned shape memory alloys (SMA), shape memory polymers (SMP), shape memory ceramics, electroactive polymers (EAP), ferromagnetic SMA's, electrorheological (ER) compositions, magnetorheological (MR) compositions, dielectric elastomers, ionic polymer metal composites (IPMC), piezoelectric polymers, piezoelectric ceramics, and the like. The active material may be in solid, liquid, or gel form and may take any geometric shape. Again, however, the present invention is particularly suited for use with actively controlled SMA wire actuators, wherein the term "wire" shall be construed to include other tensile structures such as cables, ropes, bundles, strips, chains, meshes, etc.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. Generally, in the low temperature, or Martensite phase, shape memory alloys can be plastically deformed and upon exposure to some higher temperature will transform to an Austenite phase, or parent phase, returning to their shape prior to the deformation.

Shape memory alloys exist in several different temperature-dependent phases. The most commonly utilized of these phases are the so-called Martensite and Austenite phases. In the following discussion, the Martensite phase generally refers to the more deformable, lower temperature phase whereas the Austenite phase generally refers to the more rigid, higher temperature phase. When the shape memory alloy is in the Martensite phase and is heated, it begins to change into the Austenite phase. The temperature at which this phenomenon starts is often referred to as Austenite start temperature ($A_s$). The temperature at which this phenomenon is complete is called the Austenite finish temperature ($A_f$).

When the shape memory alloy is in the Austenite phase and is cooled, it begins to change into the Martensite phase, and the temperature at which this phenomenon starts is referred to as the Martensite start temperature ($M_s$). The temperature at which Austenite finishes transforming to Martensite is called the Martensite finish temperature ($M_f$). Generally, the shape memory alloys are softer and more easily deformable in their Martensitic phase and are harder, stiffer, and/or more rigid in the Austenitic phase. In view of the foregoing, a suitable activation signal for use with shape memory alloys is a thermal activation signal having a magnitude to cause transformations between the Martensite and Austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the Martensite to Austenite type transition, and the material will recover the original, annealed shape. Hence, one-way shape memory effects are only observed upon heating. Active materials comprising shape memory alloy compositions that exhibit one-way memory effects do not automatically reform, and require an external mechanical force to return the shape to its previous configuration.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, superelastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Thus, for the purposes of this invention, it is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are one-way so that a biasing force return mechanism (such as a spring) would be required to return the SMA to its starting configuration once the applied field is removed. With particular significance here, it is appreciated that Joule heating is typically used to make the entire system electronically controllable.

Ferromagnetic SMA's (FSMA's), which are a sub-class of SMAs, may also be used in the present invention. These materials behave like conventional SMA materials that have a stress or thermally induced phase transformation between Martensite and Austenite. Additionally FSMA's are ferromagnetic and have strong magnetocrystalline anisotropy, which permit an external magnetic field to influence the orientation/fraction of field aligned Martensitic variants. When the magnetic field is removed, the material may exhibit complete two-way, partial two-way or one-way shape memory. For partial or one-way shape memory, an external stimulus, temperature, magnetic field or stress may permit the material to return to its starting state. Perfect two-way shape memory may be used for proportional control with continuous power supplied. External magnetic fields are generally produced via soft-magnetic core electromagnets in automotive applications, though a pair of Helmholtz coils may also be used for fast response. The voltage across these coils may be controlled as proposed by the present invention.

Shape memory polymers (SMP's) generally refer to a group of polymeric materials that demonstrate the ability to return to a previously defined shape when subjected to an appropriate thermal stimulus, wherein such thermal stimulus may be generated by electrically heated elements. Shape memory polymers are capable of undergoing phase transitions in which their shape is altered as a function of temperature. Generally, SMP's have two main segments, a hard segment and a soft segment. The previously defined or permanent shape can be set by melting or processing the polymer at a temperature higher than the highest thermal transition followed by cooling below that thermal transition temperature. The highest thermal transition is usually the glass transition temperature ($T_g$) or melting point of the hard segment. A temporary shape can be set by heating the material to a temperature higher than the $T_g$ or the transition temperature of the soft segment, but lower than the $T_g$ or melting point of the hard segment. The temporary shape is set while processing the material above the transition temperature of the soft segment followed by cooling to fix the shape. The material can be reverted back to the permanent shape by heating the material above the transition temperature of the soft segment.

For example, the permanent shape of the polymeric material may be a wire presenting a substantially straightened shape and defining a first length, while the temporary shape may be a similar wire defining a second length less than the first. In another embodiment, the material may present a spring having a first modulus of elasticity when activated and second modulus when deactivated.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Thus, for the purposes of this invention, it is appreciated that SMP's exhibit a dramatic drop in modulus when heated above the glass transition temperature of their constituent that has a lower glass transition temperature. If loading/deformation is maintained while the temperature is dropped, the deformed shape will be set in the SMP until it is reheated while under no load under which condition it will return to its as-molded shape. While SMP's could be used variously in block, sheet, slab, lattice, truss, fiber or foam forms, they require their temperature to be above the glass transition temperature of their constituent that has a lower glass transition temperature, i.e. a continuous power input in a low temperature environment to remain in their lower modulus state.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thickness suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Methods and Applications

Returning to FIGS. 1 and 2, the circuit 100 comprises or is otherwise operatively coupled to an active material actuator 10, such as an SMA wire drivenly coupled to a load 102. A voltage source 12 is electrically coupled to the actuator 10 and further composes the circuit 100. In FIGS. 1 and 2, for example, the voltage source 12 is configured to generate a voltage drop directly across the SMA wire 10, so as to Joule heat the wire. A controller 14 is communicatively coupled to the source 12 and actuator 10 and preferably composes the circuit 100; though it is appreciated that the controller 14 may be separately powered. The controller 14 generates an output that produces the activation signal based on the real voltage, and presents a capacity or maximum available power output (Omax). It is appreciated that the maximum available power output is time-varying (e.g., from cycle to cycle, event to event, etc.). For example, the controller 14 may be a proportional-integral-derivative (PID) controller, or servomechanism configured to receive feedback from the source 12, actuator 10, or otherwise component of the circuit 100. Lastly, voltage measuring means 16 is further coupled to the source 12, and controller 14, and may compose the circuit 100. The voltage measuring means 16 is operable to measure the actual or "real" voltage currently being produced by the voltage source 12. In a preferred embodiment, the voltage measuring means 16 is a microcontroller having a voltage divider 16a (FIG. 1).

In operation, the controller 14 is programmably configured to execute the equivalent power method, so as to reduce the effects of voltage variation during at least one actuation event, wherein an event is the period during which the activation signal is applied to activate the actuator, or a portion thereof. At an initial step of the method, an ideal (i.e., fixed, reference, etc.) voltage (Vi) is pre-determined based on the voltage source 12, wherein the ideal voltage is the normal or expected operating voltage produced by the source 12, that for which the actuator 10 is designed to function, or that which causes the actuator to optimally perform. In our automotive setting, for example, wherein the voltage source 12 is the charging system or battery (when the engine is off) of the vehicle (not shown), the ideal voltage may be 13.5 volts (V) and 12.6 V, respectively. In such a setting, the preferred controller 14 may contain the two ideal voltages, and is configured to autonomously discern when the vehicle engine is off, and apply the correct ideal voltage to the algorithm accordingly. Optionally, the ideal voltage can be a voltage substantially (e.g., greater than fifty percent) higher or lower than the source voltage.

At a second step, an ideal output (Oi) for production by the controller 14, based on the ideal voltage and other available feedback, is determined, such that the output and power generated thereby is operable to ideally activate the actuator 10. As such, the ideal output is based on the characteristics of the active material actuator 10, such as for example, the constituency and cross-sectional area of an SMA wire. It is appreciated, for example, that a wire 10 having a smaller cross-sectional area or lower transformation temperature due to its constituency will require a proportionally lesser ideal output. Moreover, the ideal output or power is also based on the desired timing and performance of the actuator 10. The ideal output, for example, may be determined based on an ideal position to be achieved by the driven load 102, or the temperature, force, or resistance profile to be achieved by the actuator 10. An ideal power calculation is made based on the ideal voltage and ideal output. For example, where the ideal voltage is 13.5 V, it is appreciated that an automotive controller 14 may present an ideal pulse-width-modulation (PWM) duty cycle output of 30%.

At a third step, the real voltage (Vr) is measured by the microcontroller 16, as shown, during the actuation event. In our example, it is appreciated that the real voltage produced by a vehicular charging system may spike to as high as 15 V. Next, an applied real output (Oapp) is autonomously determined by the controller 14 based on the ideal voltage, ideal output, and real voltage, using an equivalent power relationship. That is to say, the applied real output is calculated such that the real power, determined, for example, by the applied real output times the square of the real voltage, is equivalent to the ideal power:

$$Oapp=(Vi)^2/(Vr)^2*Oi \quad (1)$$

Thus, where the real voltage is 15 V, the ideal voltage is 13.5 V, and the ideal output is 30%, the applied real output is 24.3%. The method may be repeated without limitation, where exceeding capacity is provided, by calculating the applied real output for said at least one actuation event.

More preferably, where an initial real output (Ocalc) greater than the maximum available power output is determined, the applied real output is set to the maximum available power output. In this situation, the preferred method provides voltage out of bound compensation during a subsequent actuation event by determining, at the current event x, a positive difference ($D_x$) equal to the initial real output minus maximum available power output, and storing the difference until the next event within an activation cycle (inclusive of priming, activating, and maintaining the actuator). During the next actuation event (x+1), if the initial real output is less than the maximum available power output, at least a portion of $D_x$ is added thereto, subject again to the capacity of the controller 14, so as to determine the applied real output ($Oapp_{x+1}$).

Most preferably, the method optionally provides continuing compensation over a plurality of n events over the activation cycle. To that end, an initial difference value $D_0$ is set to zero, and for each current event x an intermediate sum ($S_x$) is further determined. $S_x$ is equal to the calculated initial real output of the current event ($Ocalc_x$) plus the difference from the preceding event ($D_{x-1}$), when $D_{x-1}$ is positive. When $D_{x-1}$ is negative (i.e. the calculated real output of the preceding event was less than the maximum available power output), $S_x$ equals $Ocalc_x$. Here, the current difference ($D_x$) is equal to $S_x$ minus Omax, and the current applied real output ($Oapp_x$) is equal to the lesser of $S_x$ and Omax. Thus, it is appreciated that for a plurality of subsequent events the differences will accrue over time and be compensated for as capacity allows. Once the activation cycle is completed any difference in memory is returned to zero.

Alternatively, the ideal and real outputs produced by the controller 14 may be controllable voltages (i.e., variable voltage levels), as opposed to PWM duty cycle, or in the case of an electrically driven servomechanism the output positioning, for example, of a valve (e.g., fluidly coupled to a heating fluid), or of a resistive circuit implement 18 operable to stabilize the activation signal of the actuator 10. FIG. 2 reflects an exemplary embodiment of the latter, wherein the circuit 100 further includes a variably resistive implement (e.g., variable resister) defining a resistance, and connected in series with the actuator 10. Here, the applied real output is operable to vary the resistance of the implement 18.

It is appreciated that an ideal value of an actuator condition corresponding to the ideal voltage may be predetermined, as opposed to determining the ideal voltage directly. In this configuration, the real voltage is determined by measuring a real value of the condition using an appropriate sensor 20 communicatively coupled to and operable to detect the condition (FIG. 2). The autonomous steps of the foregoing equivalent power method then ensue using the indirectly determined voltages. A suitable condition may be the actual actuator position, actuator temperature, actuator force, or actuator resistance, and more preferably, the associated profile over time, so as to reduce the effects of varying starting points due, for example, to differing environments.

The present invention has been described with reference to exemplary embodiments, configurations, and applications; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment, configurations, or applications dis-

What is claimed is:

1. An equivalent power method adapted for implementation by controller communicatively coupled to an active material actuator, and composing a circuit, and for reducing the effects of voltage variation during at least one actuation event, said method comprising the steps of:
   a) determining an ideal voltage within the circuit;
   b) calculating an ideal output based on the ideal voltage, such that the output is operable to ideally activate the actuator;
   c) determining an ideal power based on the ideal output and ideal voltage;
   d) measuring a real voltage during said at least one actuation event; and
   e) calculating an applied real output based on the ideal voltage, ideal output, and real voltage, such that the applied real output and real voltage determine a real power, and the real power is equivalent to the ideal power.

2. The method as claimed in claim 1, wherein the active material actuator is a shape memory alloy wire defining a constituency and cross-sectional area, and the ideal output is based on the constituency and area.

3. The method as claimed in claim 1, wherein the ideal and real outputs are controllable voltages.

4. The method as claimed in claim 1 wherein the real voltage is greater than the ideal voltage, and the applied real output is less than the ideal output.

5. The method as claimed in claim 1, wherein the applied real output (Oapp) is determined in accordance with the relationship:

$$Oapp = (Vi)^2/(Vr)^2 * Oi$$

Vr is the real voltage,
Vi is the ideal voltage, and
Oi is the ideal output.

6. The method as claimed in claim 1, wherein the real voltage is measured by a microcontroller having a voltage divider.

7. The method as claimed in claim 1, wherein the controller is a proportional-integral-derivative (PID) controller communicatively coupled to the actuator.

8. The method as claimed in claim 1, wherein the ideal and real outputs are pulse-width-modulated (PWM) control signals having a duty cycle.

9. The method as claimed in claim 1, wherein the controller presents a maximum available output (Omax), and step e) further includes the steps of calculating an initial real output greater than Omax, and setting the applied real output equal to Omax.

10. The method as claimed in claim 9, wherein step d) further includes the steps of measuring a real voltage during each of a plurality of actuation events over an activation cycle, and step e) further includes the steps of calculating an applied real output based on the ideal voltage, ideal output, and the real voltage during said each of a plurality of actuation events, and further comprising:
   f) determining a power difference (D), based on the initial real output and maximum available output, and storing D; and
   g) compensating during a subsequent actuation event, when D is positive, by calculating a subsequent real output less than the available output during the subsequent actuation event and then adding at least a portion of D to the subsequent real output, so as to determine a subsequent applied output.

11. The method as claimed in claim 10, wherein D is initially set to zero and steps e) through g) further include the steps of
   determining the difference $D_x$, the initial real output $Ocalc_x$, a sum $S_x$, and the subsequent applied output $Oapp_x$ for each subsequent event x over a plurality of n events, wherein
   $S_x$ is equal to $Ocalc_x$ plus $D_{x-1}$, when $D_{x-1}$ is positive, and $Ocalc_x$, when $D_{x-1}$ is negative,
   $Oapp_x$ is equal to the lesser of $S_x$ and Omax, and
   $D_x$ is equal to $S_x$ minus Omax.

12. The method as claimed in claim 1, wherein steps a) and d) further include the steps of determining an ideal value of a condition corresponding to the ideal voltage, and determining the real voltage by measuring a real value of the condition.

13. The method as claimed in claim 12, wherein the condition is selected from the group consisting essentially of actuator position, actuator temperature, actuator force, and actuator resistance.

14. The method as claimed in claim 1, wherein step a) further includes the steps of autonomously selecting an applicable one of a plurality of ideal voltages.

15. The method as claimed in claim 1, wherein the ideal output is determined based on a desirable position, temperature, force, or resistance profile for the actuator.

16. The method as claimed in claim 1, wherein the circuit further includes a variably resistive circuit implement defining a resistance, and the applied real output is operable to vary the resistance.

17. An equivalent power method adapted for implementation by a controller communicatively coupled to a shape memory alloy actuator, composing a circuit, presenting a maximum available power output (Omax), and for reducing the effects of voltage variation during a plurality of actuation events, and determining an applied real output, said method comprising the steps of:
   a) determining an ideal voltage within the circuit;
   b) calculating an ideal output based on the ideal voltage, such that the output is operable to ideally activate the actuator;
   c) determining an ideal power based on the ideal output and ideal voltage;
   d) measuring a real voltage for a current one of said plurality of actuation events;
   e) calculating an initial real output based on the ideal voltage, ideal output, and real voltage, such that the applied real output and real voltage determine a real power, and the real power is equivalent to the ideal power;
   f) comparing the initial real output to Omax, and setting the applied real output to Omax when the initial real output is greater than Omax, and setting the applied real output to the initial real output when the initial real output is less than Omax;
   g) determining a difference (D) equal to the initial real output minus the maximum available power output, and storing D when positive; and
   h) compensating during a subsequent actuation event, when D is positive, by calculating a subsequent real output less than the available output during the subsequent actuation event and then adding at least a portion of D to the subsequent real output, so as to determine a subsequent applied output.

\* \* \* \* \*